(12) United States Patent
Royalty

(10) Patent No.: US 7,581,002 B2
(45) Date of Patent: Aug. 25, 2009

(54) METHODS AND SYSTEMS FOR NETWORK FAILURE REPORTING

(75) Inventor: Charles D. Royalty, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 480 days.

(21) Appl. No.: 11/539,512

(22) Filed: Oct. 6, 2006

(65) Prior Publication Data

US 2008/0086554 A1  Apr. 10, 2008

(51) Int. Cl.
   *G06F 15/16* (2006.01)
(52) U.S. Cl. .................... 709/224; 244/121; 340/945
(58) Field of Classification Search ......... 709/200–203, 709/217–227; 244/121; 340/945
   See application file for complete search history.

(56) References Cited

U.S. PATENT DOCUMENTS

| 5,933,098 | A | 8/1999 | Haxton |
| 6,263,455 | B1 | 7/2001 | Bannister |
| 6,707,795 | B1 | 3/2004 | Noorhesseini et al. |
| 6,813,634 | B1 | 11/2004 | Ahmed |
| 6,883,119 | B1 | 4/2005 | Bette et al. |
| 6,947,726 | B2 * | 9/2005 | Rockwell ..................... 455/411 |
| 6,978,302 | B1 | 12/2005 | Chisholm et al. |
| 2003/0027550 | A1 | 2/2003 | Rockwell |

OTHER PUBLICATIONS

International Search Report from PCT/US2007/017612; Feb. 6, 2008; 13 pages.
Wargo, C. et al.; "Security Considerations for the e-Enabled Aircraft"; IEEE 2003; pp. 1-18.

* cited by examiner

*Primary Examiner*—Moustafa M Meky
(74) *Attorney, Agent, or Firm*—Armstrong Teasdale LLP

(57) ABSTRACT

Methods and systems for alerting airline personnel to potential aircraft data network security breaches is provided. The airline personnel includes at least one of flight crew personnel and maintenance crew personnel. The method includes detecting and categorizing potential aircraft data network security breaches, and recording said potential aircraft data network security breaches within an aircraft's existing crew alerting and maintenance data storage and reporting system.

22 Claims, 3 Drawing Sheets

METHODS AND SYSTEMS FOR NETWORK FAILURE REPORTING

BACKGROUND OF THE INVENTION

This invention relates generally to computer networks and more particularly, to methods and systems for alerting operating personnel of potential network security breaches.

The data transmitted to and from aircraft has increased dramatically. At the same time, security threats have increased, and there is a need for a method of identifying and communicating data security alerts to airline personnel. The work load of the flight crew during flight is already significant and additional monitoring and operation of the aircraft data network is not feasible. Additionally, flight deck personnel are trained in managing the significant workload using rigid procedural controls on many aspects of aircraft operation. Deviation from the familiar procedures requires additional concentration by the flight crew and may adversely affect crew workload and safe operation of the airplane. Alerts and warnings for anomalous aircraft component operation are currently presented to the flight deck crew in a rigid and structured hierarchy of incrementally prioritized messages. However, network security threats on the airplane, if presented in a manner typically used in computer systems, may distract the flight crew because airplane crews are not trained in computers, and the cabin crew cannot properly assess and recover from system faults reported by computing systems. In addition, typical maintenance crew procedures and activities for diagnosis and repair of system failures are not consistent with activities normally used to diagnose and recover from security breaches in typical computer systems.

BRIEF DESCRIPTION OF THE INVENTION

In one embodiment, a method for alerting airline personnel to potential aircraft data network security breaches includes detecting and categorizing potential aircraft data network security breaches, and recording said potential aircraft data network security breaches within an aircraft's existing maintenance data storage and reporting system.

In another embodiment, a method of operating a data network of an aircraft is provided. The data network includes at least an aircraft control portion, an airline operational services portion, a passenger entertainment portion, and a passenger owed devices portion, at least one portion including an interface to a ground based network. The method includes detecting potential network attacks on the aircraft data network, categorizing the attacks based on an incrementally more severe comprise of the safety of the aircraft from the detected attack, determining a location of the source of the attack, determining a flight crew response to the attack based on the category of the attack and the location of the source of the attack, and alerting the flight crew to the attack and the determined response through the aircraft's existing maintenance data storage and reporting system.

In yet another embodiment, an aircraft data network system communicatively coupled to an existing maintenance data storage and reporting system of an aircraft includes a plurality of network portions, each portion comprising an associated network security level, and a module communicatively coupled to said aircraft data network wherein the module is adapted to detect potential network attacks on the aircraft data network, categorize the attacks based on an incrementally more severe comprise of the safety of the aircraft from the detected attack, determine a location of the source of the attack, determine a flight crew response to the attack based on the category of the attack and the location of the source of the attack, and alert the flight crew to the attack and the determined response through the aircraft's existing maintenance data storage and reporting system.

DETAILED DESCRIPTION OF THE INVENTION

Figure 1:
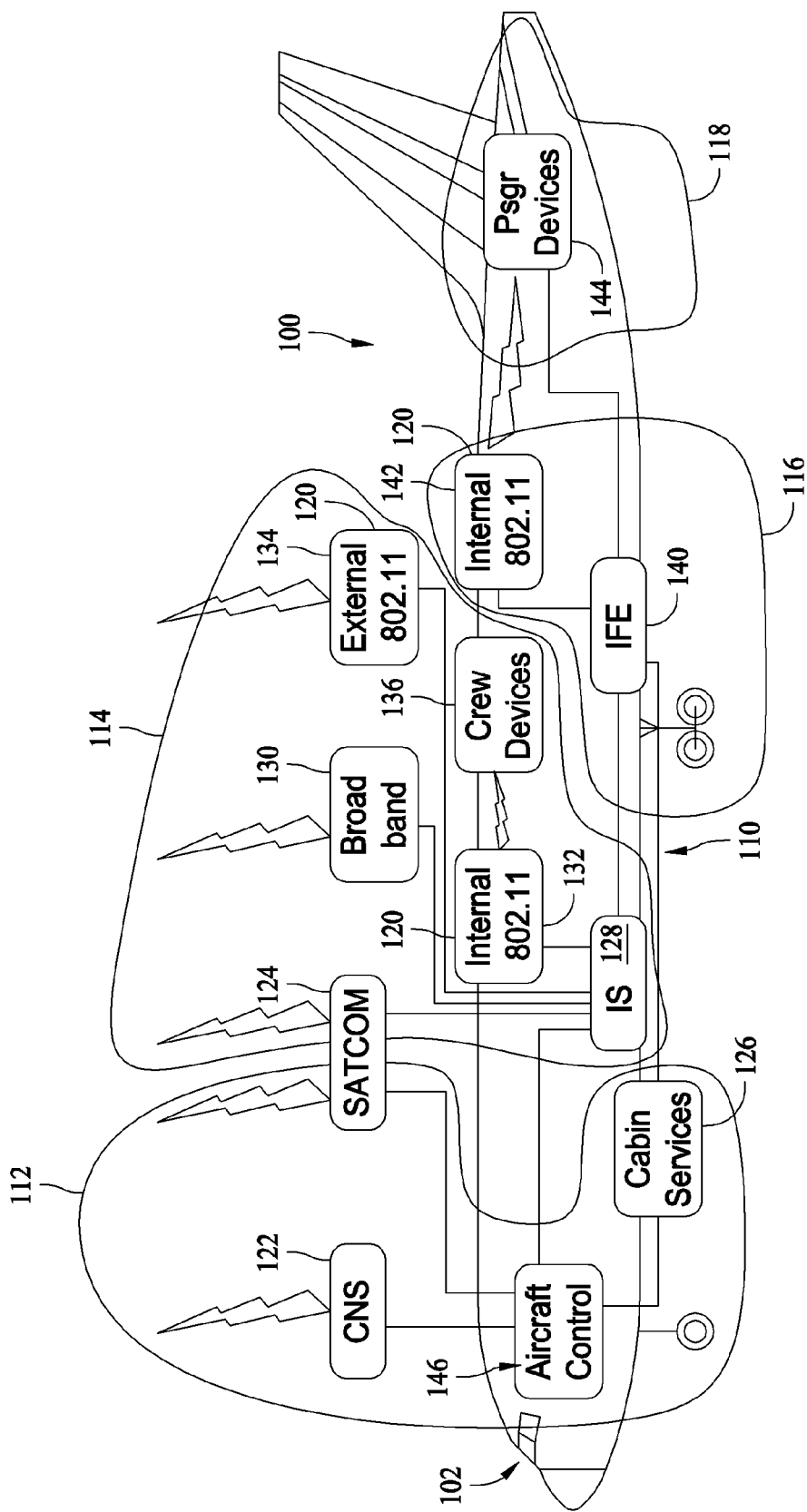
FIG. 1 is a side cross-sectional view of an aircraft in accordance with an embodiment of the present invention.

FIG. 1 is a side cross-sectional view of an aircraft 100 in accordance with an embodiment of the present invention. Aircraft 100 includes a cockpit 102 from which aircraft 100 is operated and controlled.

Aircraft 100 includes a computer network such as an aircraft data network (ADN) 110. In the exemplary embodiment, ADN 110 includes four domains with varying levels of security access requirements. ADN 110 includes an aircraft control domain 112, an airline information services domain 114, a passenger information and entertainment services domain 116, and a passenger-owned device domain 118. Aircraft control domain 112 includes flight and embedded control functions, and cabin core functions that are both used to control aircraft 100. Airline information services domain 114 includes administrative functions and passenger support functions used to operate aircraft 100. Airline information services domain 114 also includes role-specific functions such as, flight support functions, cabin support functions, and maintenance support functions. Passenger information and entertainment services domain 116 and passenger-owned device domain 118 are used to entertain the passengers. Passenger information and entertainment services domain 116 includes embedded IFE functions, a passenger Internet portal, an onboard passenger web, and a passenger device interface. Flight and embedded control functions include for example, flight controls, forward displays, air traffic and airline operational communication functions, electrical, hydraulic, and pneumatic systems, and other systems associated with "safety and regularity of flight". Cabin Core functions include control of lighting (including reading lights with light switch inputs from In-Flight Entertainment), cabin attendant call control, cabin temperature, and public address system. Administrative functions include primarily information-system-based applications that support the crew with information but don't relate directly to flight or navigation for example, electronic manuals, electronic versions of forms, sales support, and rebooking. Passenger support is passenger support applications that are a part of the airplane but operated by the passengers for example, an in-seat game/movie display.

Aircraft control domain 112 is a closed domain that does not permit modification during flight and requiring a strict access control level. Airline information services domain 114 and passenger information and entertainment services domain 116 are private domains using a privacy level of access control, and passenger-owned device domain 118 is a public domain.

In addition, aircraft control domain 112 airline information services domain 114, and passenger information and entertainment services domain 116 all include an air/ground network interface.

During operation, the various domains are in operation and providing data transmission services between devices communicatively coupled to ADN 110. Portions of ADN 110 include wireless access point support 120 such as through standard 802.11. As used herein, 802.11 refers to a family of specifications developed by the IEEE for wireless LAN technology. Standard 802.11 specifies an over-the-air interface between a wireless client and a base station or between two wireless clients. Although embodiments of the present invention are described with reference to a particular network standard, it is understood that further revisions of that standard or use of other standards is considered within the scope of the present invention.

In the exemplary embodiment, aircraft control domain 112 includes a Communications, Navigation and Surveillance System (CNS) 122 CNS 122 includes communication subsystem, for example, but not limited to radio, satellite, and wireline connections for voice and data exchange between aircraft, ground controllers (air traffic control) and airport and airline facilities, a navigation subsystem for determining the present location of an aircraft and the required course to arrive at a destination, and a surveillance subsystem for monitoring of the location and course of an aircraft for air traffic management, safety and security. Aircraft control domain 112 also includes a Satellite Communications (SATCOM) subsystem 124 that facilitates communications between the aircraft flight crew and cabin crew and ground, and a cabin services subsystem 126.

Information services domain 114 includes an information services subsystem 128 that communicatively couples to the other domains and sys-systems in the domains to facilitate operation of ADN 110. For example, information services subsystem 128 is communicatively coupled to a broadband subsystem 130 that communicates with off-board information sources, an internal and an external 802.11 wireless device. Internal 802.11 wireless device 132 is adapted to support crew devices 136.

In the exemplary embodiment, entertainment services domain 116 includes an In-flight entertainment (IFE) system 140 communicatively coupled to an internal 802.11 wireless device 142 and to passenger-owned devices 144.

A portion of ADN 110 is used for aircraft control 146 and includes an existing crew alerting system that provides warning, caution, advisory, and status messages in a structured and rigidly controlled protocol to ensure flight deck and cabin crew members only receive alerts and status messages in a familiar format. Additional maintenance diagnostic, recovery, and repair information is made available to maintenance crew through the existing maintenance data storage and reporting system.

Airplane fault messages are categorized in three basic levels; Alert, Status and Maintenance. Each level is associated with faults, system failure or non-normal conditions. When an Alert level message (warning, caution or advisory) is annunciated to the flight crew, they may be required to perform a specific nonnormal procedure or flight maneuver. Status messages are used to annunciate faults that affect airplane dispatch. Status messages do not have associated flight crew procedures. Maintenance messages generated by the maintenance data storage and reporting system are used solely for diagnostic and repair purposes, and are not displayed on the engine indicating and crew alerting system (EICAS) nor are they used to determine airplane airworthiness for dispatch. They are used for maintenance planning and troubleshooting. Engine indicating and crew alerting system (EICAS) is an integrated system to provide aircraft crew with aircraft engines and other systems instrumentation and crew annunciations. EICAS typically includes instrumentation of various engine parameters, including for example RPMs, temperature values, fuel flow and quantity, and oil pressure. Typical other aircraft systems monitored by EICAS are for example hydraulic, pneumatic, electrical, deicing, environmental and control surface systems. As EICAS has high connectivity, to systems throughout the airplane, EICAS provides data acquisition and routing.

An alert message includes time critical warnings, warnings, cautions and advisories and conform to a prioritization hierarchy based upon urgency of flight crew awareness and urgency of flight crew response. A time critical warning is used for conditions that require immediate flight crew awareness and immediate flight crew response to maintain the immediate safe operation of the airplane. A warning is used for conditions that require immediate flight crew awareness and immediate flight crew response. A caution is used for conditions that require immediate flight crew awareness and subsequent flight crew response. An advisory is used for conditions that require flight crew awareness and may require subsequent flight crew response.

A memo message annunciates a normal state of certain manually configured airplane systems, as such memo messages are not considered crew alerts, but rather they support normal airplane operation.

A status message indicates a fault has occurred that affects airplane airworthiness. Status messages are not considered crew alerts, but rather they support dispatch determination.

A maintenance system indication includes maintenance messages that indicate that a fault has been detected that airplane operators may repair. They are not used to indicate the loss of a flight critical function or a loss of airworthiness. The maintenance system indication also includes maintenance memos that indicate that one or more faults have been detected in a system, causing the system to be one failure from affecting airplane dispatch.

Other flight deck effects (FDE) include flags that indicate a loss of valid display data or loss of function, exceedences that indicate anomalies in selected parameters, and voice aural and tactile feel.

During preflight, a review of the Alert and Status messages and log book entries is required to verify airplane airworthiness for dispatchability. This review may be done by maintenance, flight crew, airplane dispatcher or a combination of the three. At least some EICAS alert messages are normally displayed during preflight, but are not intended to identify faults affecting the dispatch of the airplane. Additionally, many airplane systems are turned off or not used during the airplane preflight thereby preventing real time faults in these systems from being sensed.

Faults and anomalies in ADN 110 are also integrated into the existing maintenance data storage and reporting system such that alert, status, and maintenance messages originating in ADN 110 are transmitted to the flight crew in a standard and familiar manner through the existing aircraft alert and warning protocol. Professional network and system administration services onboard the airplane will be extremely limited and are to be assumed to be nonexistent in the traditional information technology sense. This complex network environment results in formidable security issues in a number of security domains.

The security for ADN 110 includes three categories of countermeasures, protection, detection, and response.

Because protection alone is generally accepted as being incapable of securing a network from a determined attack for an indefinite period of time, ADN 110 is able to identify attacks (including anomalous activity which may be a known precursor to attack) when they occur and have available a range of responses up to, and including, shutting down the network. Security functions are implemented such that, for anticipated attack methods, detection occurs in time to make measured response feasible before protection is compromised. When actions by security functions affect airplane flight safety or require maintenance action, embodiments of the present invention provide a means to notify and advise crew members as to the correct course of action without requiring special training in computer security.

The diverse uses of ADN 110 dictate that responses to security violations be both robust and incremental. For example, denying network services to a cabin full of passengers in response to a simple probe is unreasonable (and even invites denial of service attacks), although if such a probe came from a particular seat it might be reasonable to deny service to the seat. Even worse is denying network access to the crew due to activity that originates in the passenger network. Responses are developed with service impacts in mind, and lower impact responses are attempted prior to a total shutdown. Shutting down the entire network is an available defense but, one that is used as a last resort. In denying service as a response, the priorities are, shut down specific services to specific ports, shut down specific services to the entire network or a portion of the network, shut down physical ports completely (for example, a seat), shut down or isolate portions of the network (for example, isolate the IFE network from the rest of the airplane network, shut down the entire network. In the exemplary embodiment, crew services have priority over passenger services. For example, it is more serious to deny service to crew than to passengers. It is also generally more serious to deny service to flight crew than to cabin crew or maintenance crew. The priority of access to the network by offboard parties will depend in part on whether remote access by off-board service personnel is a part of recovery and restoration services. For airborne networks which are connected to the terrestrial Internet, substantially more sophisticated responses may be possible with the aid of ground-based administrators.

Crew members are the primary means of direct human intervention onboard the airplane. Recovery procedures are limited to a simple physical or logical reset operation on specific functions or components to avoid significant distraction of crew members or the necessity of extensive training in the area of network systems. The operations are included in procedures, such as operations or fault isolation procedures.

Figure 2:
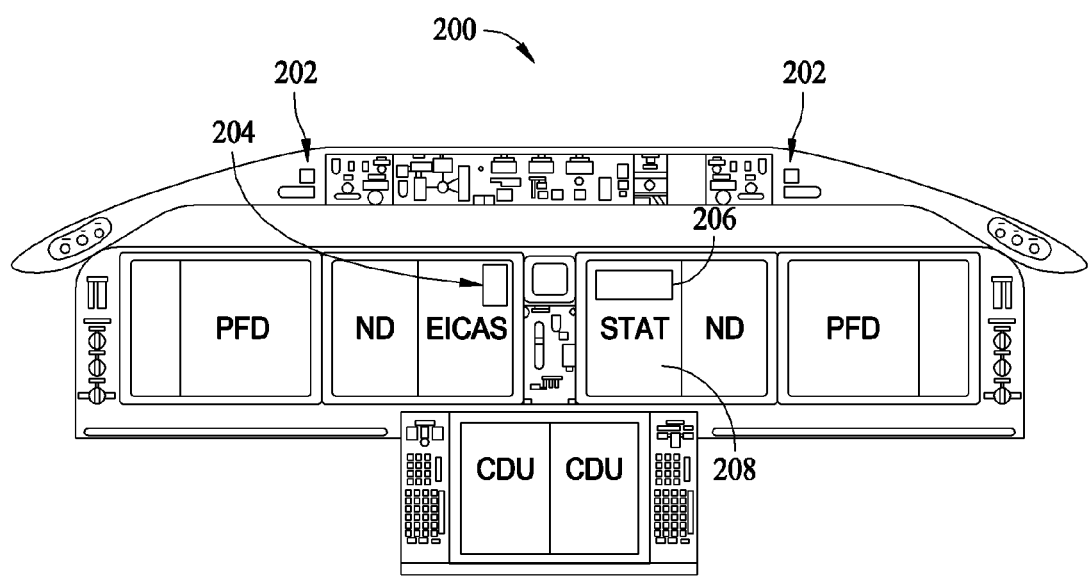
FIG. 2 is a forward perspective view of a forward panel crew alerting display that may be used with the aircraft shown in FIG. 1.

FIG. 2 is a forward perspective view of a forward panel crew alerting display 200 that may be used with aircraft 100 (shown in FIG. 1). In the exemplary embodiment, forward panel crew alerting display 200 includes a master warning and caution lights 202 that annunciate time critical warnings, warning and, caution alerts. An EICAS alert messages field 204 is used to display warning, caution and advisory alert messages, communication alert messages, and memo messages. Status messages are displayed in a status message field 206 on a STAT display 208.

Figure 3:
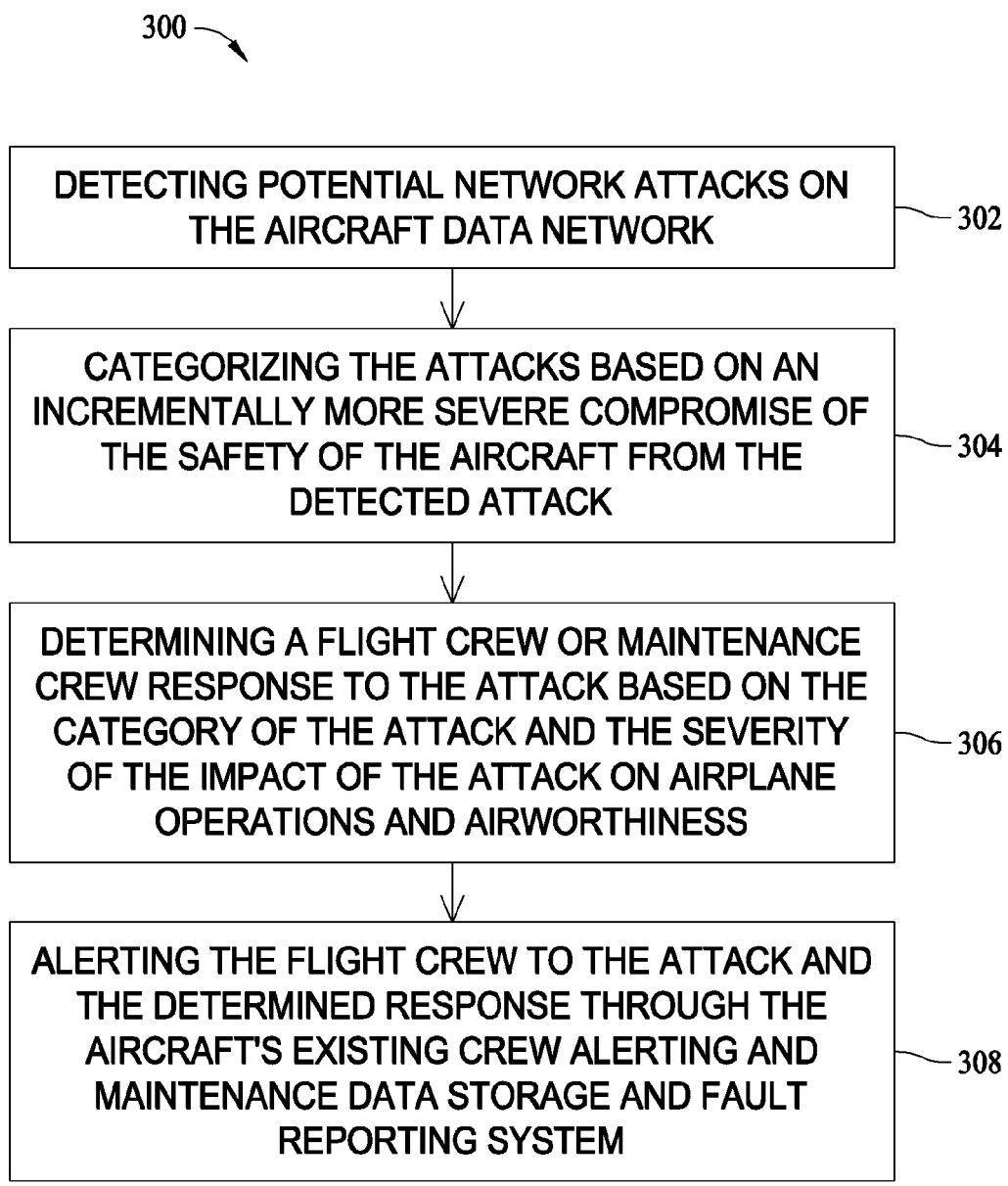
FIG. 3 is a flow chart of an exemplary method of alerting airline personnel to potential aircraft data network security breaches that may be used with the aircraft shown in FIG. 1.

FIG. 3 is a flow chart of an exemplary method 300 of alerting airline personnel to potential aircraft data network security breaches that may be used with aircraft 100 (shown in FIG. 1). Method 300 includes detecting 302 potential network attacks on the aircraft data network, categorizing 304 the attacks based on an incrementally more severe comprise of the safety of the aircraft from the detected attack. Method 300 also includes determining 306 a flight crew response to the attack based on the category of the attack and the severity of the impact of the attack, and alerting 308 the flight crew to the attack and the determined response through the aircraft's existing maintenance data storage and reporting system. Method 300 develops reporting requirements for security system failures and ranks the security faults into the fault reporting hierarchy that exists for the airplane. Method 300 couples network security messages and alerts into the existing maintenance faults, especially in vehicles, where the support staff is not present and the crew must deal with the fault. The primary function of the crew is to fly the airplane, and not to deal with security breaches; the support staff on the ground can respond more appropriately to security alerts. Method 300 further describes a process for hosting security alerts on the existing system used to gather hardware and maintenance information data and displays only those message that necessitate flight crew attention to ease the workload on the aircraft crew.

Tables 1 and 2 below describe the maintenance effect and/or flight deck effect of a variety of network security data or events. The security events are evaluated and categorized accordingly to their relative threat to the safe flight and airworthiness of the aircraft. At least some events do not warrant a notification to flight deck personnel, while other events indicate a serious attack that may jeopardize the flight of the aircraft. Categorized events are displayed to the flight deck crew in a familiar presentation based on the existing maintenance data storage and reporting system.

TABLE 1

| Security Data or Event | Correlated Maintenance Effect | Description |
| --- | --- | --- |
| Security logs & audit files | Shop Fault | System-specific records not relevant to airplane dispatch; use for detailed diagnostics and trend analysis |
| Transitory events; event threshold exceedances; mode discrepancy | Maintenance Message | Indicates that a fault or failure has occurred. Maintenance crew acts on these messages to diagnose and repair faulty equipment. |
| | Maintenance Memo | Indicates that a subsequent occurrence will affect dispatch. Maintenance crew acts on these messages to diagnose and repair faulty equipment. |
| A security event or effect requiring investigation and remediation prior to subsequent airplane dispatch. | Status Message (Flight Deck Effect) | Indicates that a fault or failure affecting dispatch has occurred. Maintenance crew acts on these messages. Does not require Flight Crew action. |

TABLE 1-continued

| Security Data or Event | Correlated Maintenance Effect | Description |
| --- | --- | --- |
| A security event or effect requiring notification of or action by the Flight Crew. | Advisory (Flight Deck Effect) | A serious anomaly indicative of a successful network attack that may escalate to events with safety implications. May also be used to alert the flight crew to specific passenger activities in flight to permit preparation of law enforcement or other response on the ground prior to passengers disembarking. |
| A security event or effect with potential implications for flight safety. May involve flight crew procedures to preclude a more severe event. | Caution (Flight Deck Effect) | A serious anomaly indicative of a degradation in safety-related systems or functions. Crew response may involve alternate procedures and potentially diversion of the aircraft. |
| A security event of effect with immediate implications for flight safety and requiring immediate action in response. | Warning (Flight Deck Effect) | An event requiring immediate action to ensure the safety of the aircraft. May involve emergency procedures up to requiring immediate landing. |

TABLE 2

| Security Data or Event | Correlated Maintenance/FDE Item | |
| --- | --- | --- |
| Security logs & audit files | Shop fault records - stored in local system or on central mass storage server | Ad hoc records specific to the function or LRU |
| Transitory events (e.g., invalid address detected on LAN segment) | Active fault - reported to Central Maintenance function by detecting system | Maintenance System: Indicate when active; record occurrences |
| Persistent condition (e.g., unauthorized configuration detected) | Latched fault - reported to Central Maintenance function by detecting system | Maintenance System: Indicate when latched; procedure to unlatch is required |
| Condition that precludes airplane dispatch until corrected. | Maintenance status message - reported to Crew Alerting System by detecting system | Correction of the condition is required to clear the message. The system reporting the condition determines when the condition is cleared. |
| Condition that requires flight crew notification. Assumes that crew will continue monitoring and potentially take action. | Crew Alerting System status message - reported to Crew Alerting System by detecting system | Correction of the condition is required to clear the message. The system reporting the condition determines when the condition is cleared. |
| Condition that requires flight crew notification and response. Severity of condition and required immediacy of response differentiates between an alert or warning. | Crew Alerting System alert or warning message - reported to Crew Alerting System by detecting system | Correction of the condition is required to clear the message. The system reporting the condition determines when the condition is cleared. |

The above described methods and systems provide mechanisms to report potential security threats using the proven maintenance approach to provide a security reporting capability benefit, as the above described methods and systems fit into the existing processes that both airframe manufacturers and their customers have, thereby eliminating the need to develop and train to another method. The above described method for setting the crew alerts is consistent with present practice. In addition, advisories are used for the flight crew which alerts them to specific passenger activities in flight to permit preparation of law enforcement or other response on the ground prior to passengers disembarking.

The above-described methods and systems for alerting airline personnel to potential aircraft data network security breaches are cost-effective and highly reliable. The network detects potential breaches and categorizes the breaches consistent with the existing maintenance data reporting system incremental priority protocol. The method facilitates informing flight deck personnel of network security threats in a timely manner while simply recording potential breaches of a minor nature for maintenance crew evaluation post-flight in a cost-effective and reliable manner.

While the invention has been described in terms of various specific embodiments, those skilled in the art will recognize that the invention can be practiced with modification within the spirit and scope of the claims.

What is claimed is:

1. A method for alerting airline personnel to potential aircraft data network security breaches wherein the airline personnel includes at least one of flight crew personnel and maintenance crew personnel, said method comprising:
   detecting and categorizing potential aircraft data network security breaches;
   notifying at least one of flight deck and cabin crew members as to a correct course of action with respect to the security breaches via alerts and messages provided in a familiar format; and
   recording said potential aircraft data network security breaches within an aircraft's existing maintenance data storage and reporting system.

2. A method in accordance with claim 1 wherein said detecting and categorizing potential aircraft data network security breaches comprises categorizing a detected aircraft data network security fault or failure that affects the dispatch of an associated aircraft using a message, said notifying comprises sending a status message is readable by the aircraft maintenance crew, said status message does not require action by a flight crew operating the aircraft.

3. A method in accordance with claim 1 wherein said detecting and categorizing potential aircraft data network security breaches comprises categorizing a detected anomaly indicative of a successful aircraft data network attack, said notifying comprises using an advisory message, said advisory message informing the flight crew of specific passenger activities in flight.

4. A method in accordance with claim 3 wherein said categorizing a detected anomaly indicative of a successful aircraft data network attack comprises locating a specific connection to the aircraft data network where the attack originated and disabling the specific connection.

5. A method in accordance with claim 4 wherein said locating a specific connection to the aircraft data network where the attack originated comprises alerting law enforcement personnel of potential criminal activity.

6. A method in accordance with claim 1 wherein said detecting and categorizing potential aircraft data network security breaches comprises categorizing a detected anomaly indicative of a degradation in safety-related systems or functions using a message, said notifying comprises sending a caution message informing the flight crew of alternate procedures and potentially diversion of the aircraft.

7. A method in accordance with claim 1 wherein said detecting and categorizing potential aircraft data network security breaches comprises categorizing a detected event that requires immediate flight crew action to ensure the safety of the aircraft as a warning, said notifying comprises sending a warning message informing the flight crew of emergency procedures up to an immediate landing of the aircraft.

8. A method of operating a data network of an aircraft wherein the data network includes at least an aircraft control portion, an airline operational services portion, a passenger entertainment portion, and a passenger owned devices portion, at least one portion including an interface to a ground based network, said method comprising:
   detecting potential network attacks on the aircraft data network;
   categorizing the attacks based on an incrementally more severe compromise of the safety of the aircraft from the detected attack;
   determining a flight crew response to the attack based on the category of the attack; and
   alerting the flight crew to the attack and the determined response though the aircraft's existing crew alerting system.

9. A method in accordance with claim 8 further comprising displaying maintenance diagnostic and recovery response information on the existing maintenance data storage and reporting system.

10. A method in accordance with claim 8 wherein said determining a flight crew response comprises determining whether shutting down a specific service at a specific port will isolate the attack.

11. A method in accordance with claim 8 wherein said determining a flight crew response comprises determining whether shutting down a specific service to a portion of the network will isolate the attack.

12. A method in accordance with claim 8 wherein said determining a flight crew response comprises determining whether completely shutting down a physical port will isolate the attack.

13. A method in accordance with claim 8 wherein said determining a flight crew response comprises determining whether completely shutting down a portion of the network will isolate the attack.

14. A method in accordance with claim 8 wherein said determining a flight crew response comprises permitting access to the aircraft data network by off-board service personnel for recovery services.

15. A method in accordance with claim 8 further comprising determining an object of the attack.

16. An aircraft data network system communicatively coupled to an existing crew alerting and a maintenance data storage and reporting system of an aircraft, said aircraft data network comprising:
   a plurality of network portions, each portion comprising an associated network security level;
   a module communicatively coupled to said aircraft data network, said module adapted to:
   detect potential network attacks on the aircraft data network;
   categorize the attacks based on an incrementally more severe compromise of the safety of the aircraft from the detected attack;
   determine a flight crew response to the attack based on the category of the attack and the location of the source of the attack; and
   alert the flight crew to the attack and the determined response through the aircraft's existing crew alerting system.

17. A system in accordance with claim 16 wherein said module is further configured to display maintenance diagnostic and recovery response information on the existing maintenance data storage and reporting system.

18. A system in accordance with claim 16 wherein said aircraft data network includes at least an aircraft control portion, an aircraft service portion, and a passenger owned devices portion, at least one portion including an interface to a ground based network.

19. A system in accordance with claim 16 wherein said module is further adapted to determine whether shutting down a specific service at a specific port will isolate the attack.

20. A system in accordance with claim 16 wherein said module is further adapted to determine whether shutting down a specific service to a portion of the network will isolate the attack.

21. A system in accordance with claim 16 wherein said module is adapted to categorize the attacks based on an incrementally more severe comprise of the safety of the aircraft from the detected attack.

22. A system in accordance with claim 16 wherein said module is adapted to locate a specific connection to the aircraft data network where the attack originated and disable the specific connection.

* * * * *